(12) United States Patent
Kahle

(10) Patent No.: US 6,697,939 B1
(45) Date of Patent: Feb. 24, 2004

(54) BASIC BLOCK CACHE MICROPROCESSOR WITH INSTRUCTION HISTORY INFORMATION

(75) Inventor: James Allan Kahle, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/477,569

(22) Filed: Jan. 6, 2000

(51) Int. Cl.[7] ................................. G06F 9/00
(52) U.S. Cl. .......................... 712/244; 712/240
(58) Field of Search ........................ 712/244, 240

(56) References Cited

U.S. PATENT DOCUMENTS

| | | | | |
|---|---|---|---|---|
| 4,176,394 A | * | 11/1979 | Kaminski et al. | 712/227 |
| 5,214,763 A | * | 5/1993 | Blaner et al. | 712/212 |
| 5,287,467 A | * | 2/1994 | Blaner et al. | 712/235 |
| 5,333,280 A | * | 7/1994 | Ishikawa et al. | 712/215 |
| 5,504,925 A | * | 4/1996 | Jeffs | 712/244 |
| 5,887,161 A | * | 3/1999 | Cheong et al. | 712/228 |
| 5,925,124 A | * | 7/1999 | Hilgendorf et al. | 712/209 |
| 6,108,768 A | * | 8/2000 | Koppala et al. | 711/132 |
| 6,185,675 B1 | * | 2/2001 | Kranich et al. | 711/125 |
| 6,324,640 B1 | * | 11/2001 | Le et al. | 712/212 |

FOREIGN PATENT DOCUMENTS

EP 454985 A2 * 11/1991

OTHER PUBLICATIONS

Smith, J. E. and Pleszaskun, A. R., "Implementing Precise Interrupts in Pipelined Processors," IEEE Transaction on Computers, May 1988, vol. 37, No. 5, pp. 562–573.*

Johnson, Mike. Superscalar Microprocessor Design. PTR Prentice Hall 1991. Pp. 182–199, 233–235.*

* cited by examiner

*Primary Examiner*—David Wiley
*Assistant Examiner*—Scott M. Collins
(74) *Attorney, Agent, or Firm*—Joseph P. Lally; Diana L. Roberts; Volel Emile

(57) ABSTRACT

A processor, data processing system, and a related method of execution are disclosed. The processor is suitable for receiving a set of instructions and organizing the set of instructions into an instruction group. The instruction group is then dispatched for execution. Upon executing the instruction group, instruction history information indicative of an exception event associated with the instruction group is recorded. Thereafter, the execution of the instruction is modified responsive to the instruction history information to prevent the exception event from occurring during a subsequent execution of the instruction group. The processor includes a storage facility such as an instruction cache, an L2 cache or a system memory, a cracking unit, and a basic block cache. The cracking unit is configured to receive a set of instructions from the storage facility. The cracking unit is adapted to organize the set of instructions into an instruction group.

12 Claims, 8 Drawing Sheets

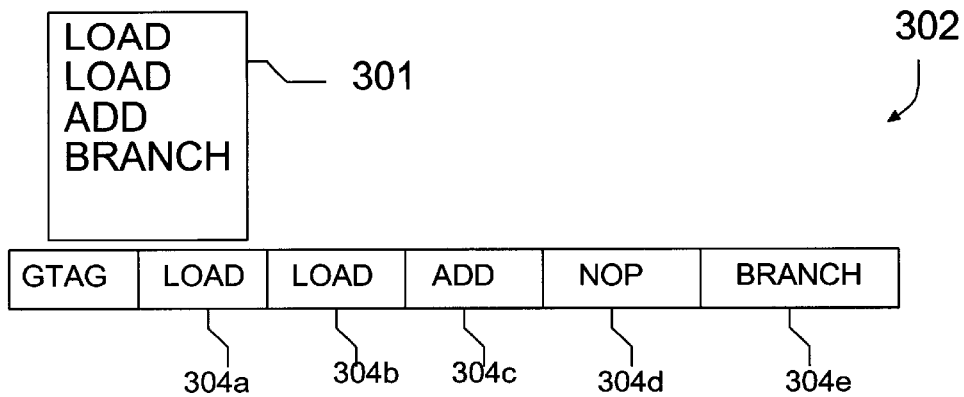
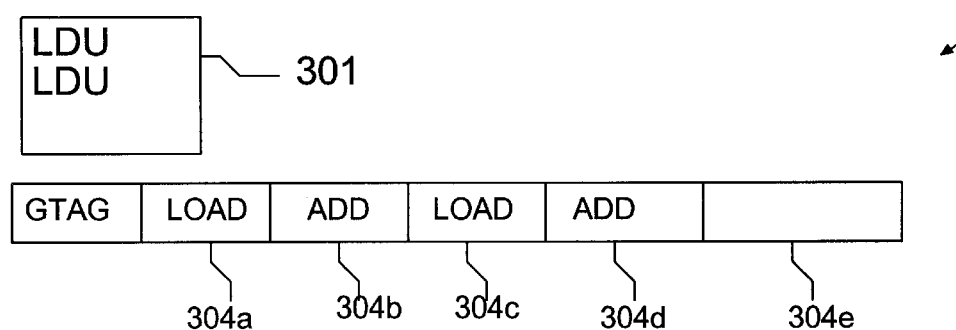
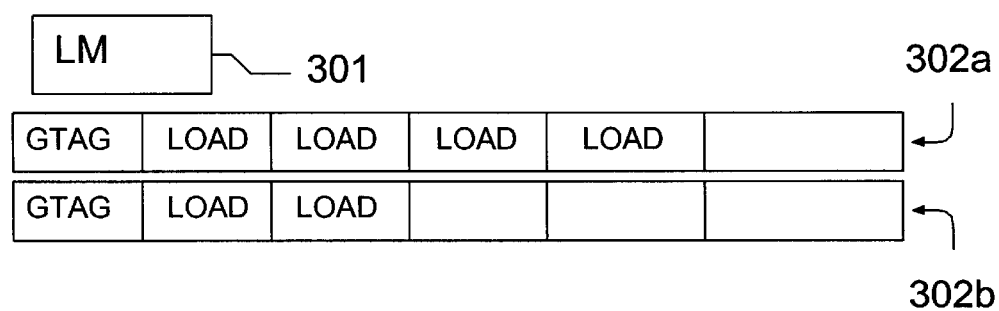
FIG 3

US 6,697,939 B1

BASIC BLOCK CACHE MICROPROCESSOR WITH INSTRUCTION HISTORY INFORMATION

RELATED APPLICATION

The subject matter disclosed herein is related to the subject matter disclosed in the U.S. patent application entitled *Instruction Group Organization and Exception Handling in a Microprocessor*, Ser. No. 09/428,399, filed Oct. 28, 1999, which shares a common assignee with the present application and is incorporated by reference herein.

BACKGROUND

1. Field of the Present Invention

The present invention generally relates to the field of microprocessor architectures and more particularly to a microprocessor utilizing an instruction group architecture, a corresponding cache facility, and useful extensions thereof.

2. History of Related Art

As microprocessor technology has enabled gigahertz performance, a major challenge for microprocessor designers is to take advantage of state-of-the-art technologies while maintaining compatibility with the enormous base of installed software designed for operation with a particular instruction set architecture (ISA). To address this problem, designers have implemented "layered architecture" microprocessors that are adapted to receive instructions formatted according to an existing ISA and to convert the instruction format of the received instructions to an internal ISA that is more suitable for operation in gigahertz execution pipelines. Turning to FIG. 4, selected portions of a layered architecture microprocessor 401 are presented. In this design, an instruction cache 410 of microprocessor 401 receives and stores instructions fetched from main memory by a fetch unit 402. The instructions stored in instruction cache unit 410 are formatted according to a first ISA (i.e., the ISA in which the programs being executed by processor 401 are written). Instructions are then retrieved from instruction cache 410 and converted to a second ISA by an ISA conversion unit 412. Because the conversion of instructions from the first ISA to the second ISA requires multiple cycles, the conversion process is typically pipelined and, accordingly, there may be multiple instructions being converted from the first ISA to the second ISA at any given time. The converted instructions are then forwarded for execution in the execution pipelines 422 of processor 401. The fetch unit 402 includes branch prediction logic 406 that attempts to determine the address of the instruction that will be executed following a branch instruction by predicting the outcome of the branch decision. Instructions are then speculatively issued and executed based on the branch predictions. When a branch is mispredicted, however, the instructions that are pending between instruction cache 410 and finish stage 432 of processor 401 must be flushed. The performance penalty that is incurred when a mispredicted branch results in a system flush, is a function of the length of the pipeline. The greater the number of pipeline stages that must be flushed, the greater the branch mispredict performance penalty. Because the layered architecture adds to the processor pipeline and increases that number of instructions that are potentially "in flight," at a given time, the branch mispredict penalty associated with a layered architecture can become a limiting factor in the processor's performance. It would therefore be highly desirable to implement a layered architecture microprocessor that addressed the branch mispredict performance penalty. In addition it would be further desirable if the implemented solution addressed, at least in part, repetitive occurrences of exception conditions resulting from repeated execution of a piece of code. It would be further desirable if implemented solution enabled an effectively larger issue queue without sacrificing the ability to search the issue queue for the next instruction to execute.

SUMMARY OF THE INVENTION

The problems identified above are in large part addressed by a microprocessor that utilizes instruction groups and a cache facility that is matched to the instruction group format. One embodiment of the invention contemplates a microprocessor and an associated method and data processing system. The microprocessor includes an instruction cracking configured to receive a first set of microprocessor instructions. The cracking unit organizes the set of instructions as an instruction group where each of the instructions in the group shares a common instruction group tag. The processor further includes a basic block cache facility that is organized with the instruction group format and is configured to cache the instruction groups generated by the cracking unit. An execution unit of the processor is suitable for executing the instructions in an instruction group. In one embodiment, when an exception is generated during execution of an instruction in the instruction group that causes a flush, the flush flushes only those instructions that have been dispatched from the basic block cache. By flushing only those instructions that have arrived at the basic block cache, the processor spares the instructions pending in the cracking unit pipeline from being flushed. Because fewer instructions are flushed, the exception performance penalty is reduced. In one embodiment, the received instructions are formatted according to a first instruction format and the second set of instructions are formatted according to a second instruction format wherein the second instruction format is wider than the first instruction format. The basic block cache is suitably configured to store each instruction group in a corresponding entry of the basic block cache. In one embodiment, each entry in the basic block cache includes an entry field indicative of the corresponding basic block cache entry and a pointer predictive of the next of the instruction group to be executed. The processor is preferably configured to update a pointer of a cache entry responsive to a mispredicted branch.

The invention further contemplates a processor, data processing system and method utilizing instruction history information in conjunction with the basic block cache to improve performance. The processor is suitable for receiving a set of instructions and organizing the set of instructions into an instruction group. The instruction group is then dispatched for execution. Upon executing the instruction group, instruction history information indicative of an exception event associated with the instruction group is recorded. Thereafter, the execution of the instruction is modified responsive to the instruction history information to prevent the exception event from occurring during a subsequent execution of the instruction group. The processor includes a storage facility such as an instruction cache, an L2 cache or a system memory, a cracking unit, and a basic block cache. The cracking unit is configured to receive a set of instructions from the storage facility. The cracking unit is adapted to organize the set of instructions into an instruction group. The cracking unit may modify the format of the set of instructions from a first instruction format to a second instruction format. The architecture of the basic block cache is suitable for storing the instruction groups. The basic block cache includes an instruction history field corresponding to each basic block cache entry. The instruction history information is indicative of an exception event associated with the instruction group. In the preferred embodiment, each entry in the basic block cache corresponds to a single instruction group generated by the cracking unit. The processor may further include completion table control logic configured to store information in the instruction history field when the instruction group completes. The instruction history information may be indicative of whether an instruction in the instruction group has a dependency on another instruction or may be indicative of whether the execution of the instruction group previously resulted in a store forwarding exception. In this embodiment, the processor is configured to execute in an in-order-mode responsive to detecting that the execution of the instruction group previously resulted in the store forwarding exception.

The invention still further contemplates a processor, data processing system and an associated method utilizing primary and secondary issue queues. The processor is suitable for dispatching an instruction to an issue unit. The issue unit includes a primary issue queue and a secondary issue queue. The instruction is stored in the primary issue queue if the instruction is currently eligible to issue for execution. The instruction is stored in the secondary issue queue if the instruction is currently ineligible to issue for execution. The processor determines the next instruction to issue from the instructions in the primary issue queue. An instruction may be moved from the primary issue queue to the secondary issue queue if instruction is dependent upon results from another instruction. In one embodiment, the instruction may be moved from the primary issue queue to the secondary issue queue after issuing the instruction for execution. In this embodiment, the instruction may be maintained in the secondary issue queue for a specified duration. Thereafter, the secondary issue queue entry containing the instruction is deallocated if the instruction has not been rejected. The microprocessor includes an instruction cache, a dispatch unit configured to received instructions from the instruction cache, and an issue unit configured to receive instructions from the dispatch unit. The issue unit is adapted to allocate dispatched instructions that are currently eligible for execution to a primary issue queue and to allocate dispatched instructions that are not currently eligible for execution to a secondary issue queue.

BRIEF DESCRIPTION OF THE DRAWINGS

Other objects and advantages of the invention will become apparent upon reading the following detailed description and upon reference to the accompanying drawings in which:

FIG. 3 illustrates examples of the instruction cracking function performed by one embodiment of the processor of FIG. 2;

Figure 1:
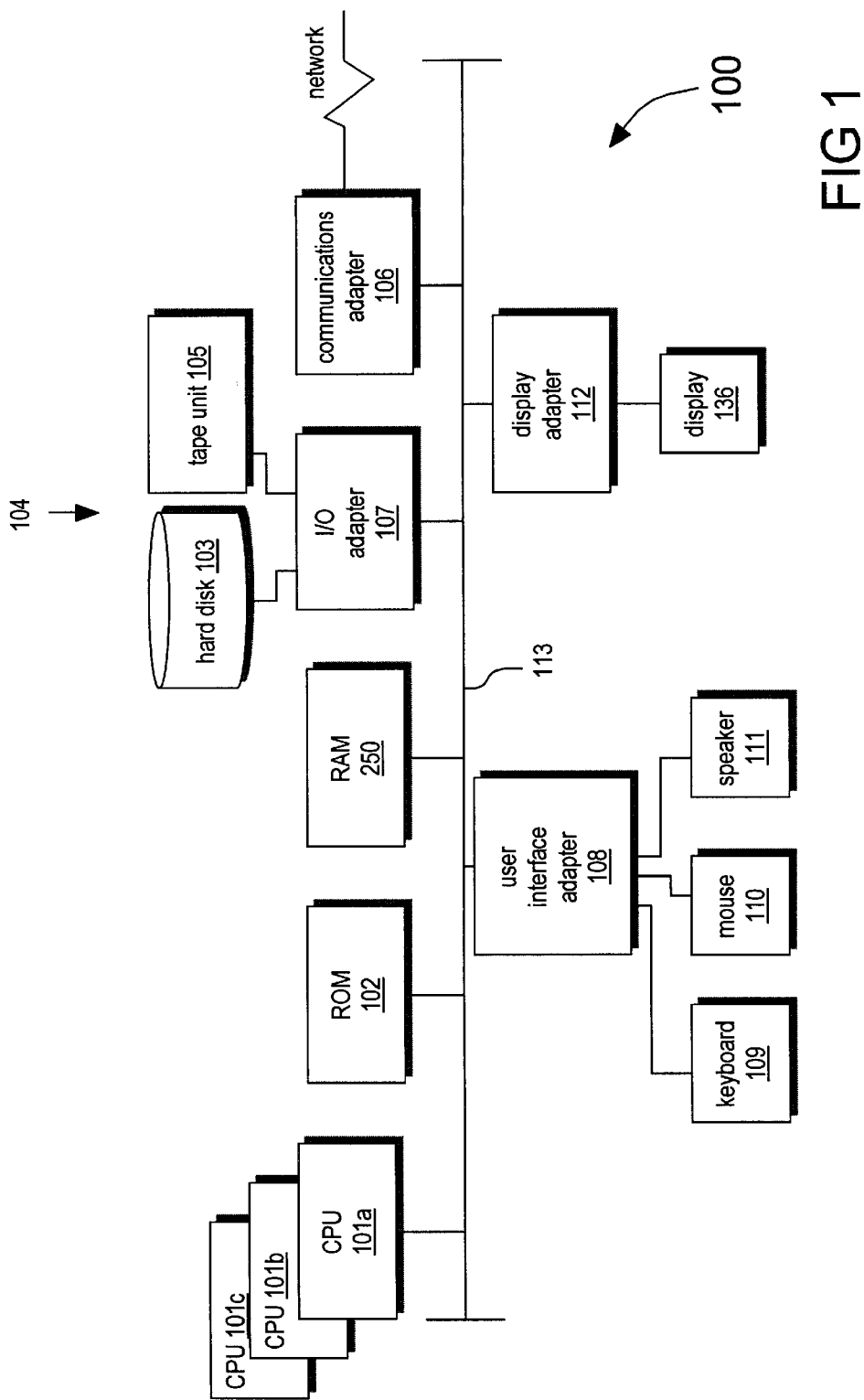
FIG. 1 is a block diagram of selected components of a data processing system including a microprocessor according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Referring now to FIG. 1, an embodiment of a data processing system 100 according to the present invention is depicted. System 100 includes one or more central processing units (processors) 101a, 101b, 101c, etc. (collectively or generically referred to as processor(s) 101. In one embodiment, each processor 101 may comprise a reduced instruction set computer (RISC) microprocessor. Additional information concerning RISC processors in general is available in C. May et al. Ed., *PowerPC Architecture: A Specification for a New Family of RISC Processors*, (Morgan Kaufmann, 1994 2d edition). Processors 101 are coupled to system memory 250 and various other components via system bus 113. Read only memory (ROM) 102 is coupled to the system bus 113 and may include a basic input/output system (BIOS), which controls certain basic functions of system 100. FIG. 1 further depicts an I/O adapter 107 and a network adapter 106 coupled to the system bus 113. I/O adapter 107 links system bus 113 with mass storage devices 104 such as a hard disk 103 and/or a tape storage drive 105. Network adapter 106 interconnects bus 113 with an external network enabling data processing system 100 to communicate with other such systems. Display monitor 136 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O busses for connecting peripheral devices such as hard disk controllers, network adapters, and graphics adapters include the Peripheral Components Interface (PCI) bus as specified according to PCI Local Bus Specification Rev. 2.2 available from the PCI Special Interest Group, Hillsboro, Oreg., and incorporated by reference herein. Additional input/output devices are shown as connected to system bus 113 via user interface adapter 108. A keyboard 109, mouse 110, and speaker 111 are all linked to bus 113 via user interface adapter 108, which may include, for example, a SuperI/O chip integrating multiple device adapters into a single integrated circuit. For additional information concerning one such chip, the reader is referred to the PC87338/PC97338 ACPI 1.0 and PC98/99 *Compliant SuperI/O* data sheet from National Semiconductor Corporation (November 1998) at www.national.com. Thus, as configured in FIG. 1, system 100 includes processing means in the form of processors 101, storage means including system memory 250 and mass storage 104, input means such as keyboard 109 and mouse 110, and output means including speaker 111 and display 136. In one embodiment a portion of system memory 250 and mass storage 104 collectively store an operating system such as the AIX® operating system from IBM Corporation or other suitable operating system to coordinate the functions of the various components shown in FIG. 1. Additional detail concerning the AIX operating system is available in *AIX Version 4.3 Technical Reference: Base Operating System and Extensions, Volumes 1 and 2* (order numbers SC23-4159 and SC23-4160); *AIX Version 4.3 System User's Guide: Communications and Networks* (order number SC23-4122), and *AIX Version 4.3 System User's Guide: Operating System and Devices* (order number SC23-4121) from IBM Corporation at www.ibm.com and incorporated by reference herein.

Figure 2:
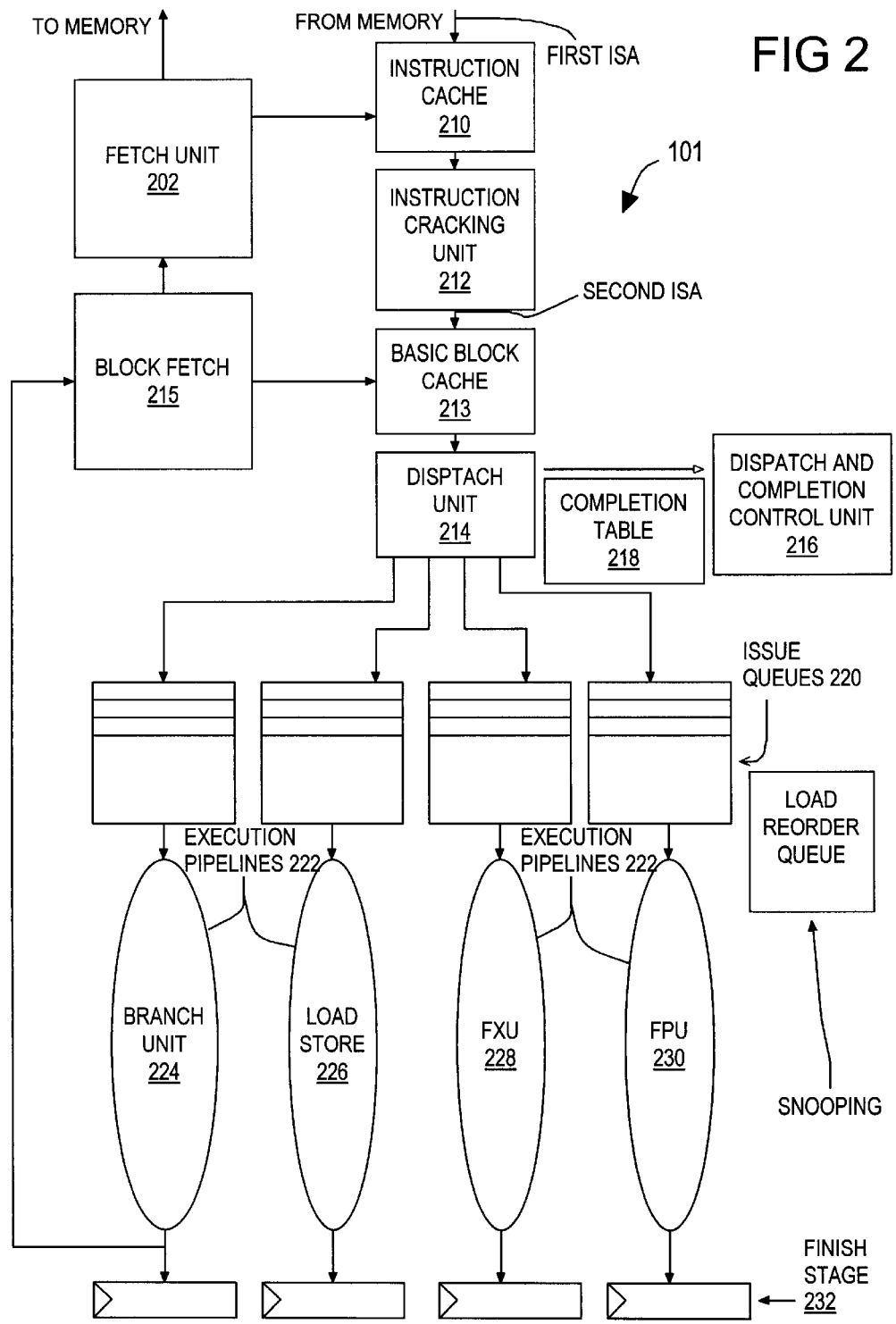
FIG. 2 is a block diagram of selected components of a microprocessor according to one embodiment of the present invention.
Figure 4:
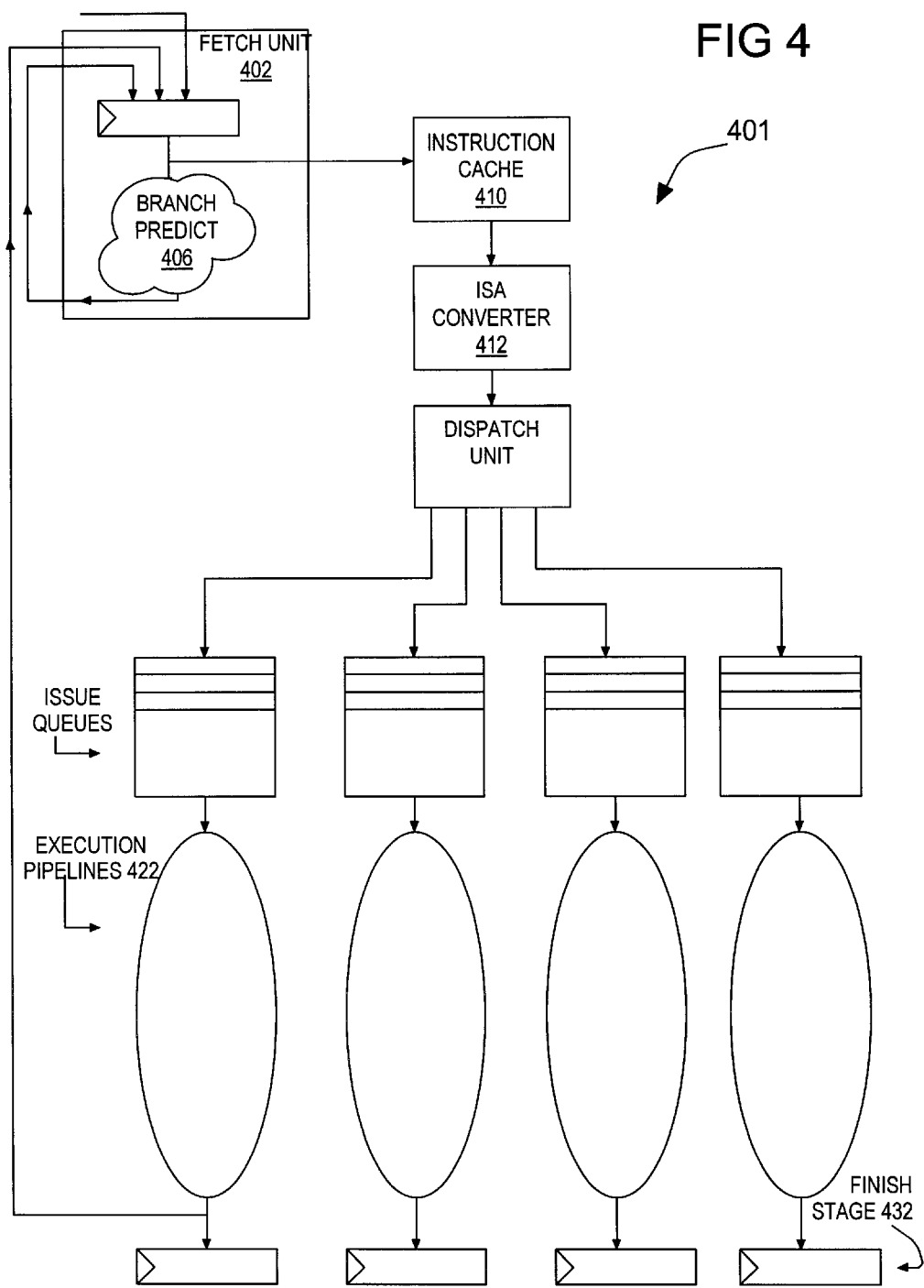
FIG. 4 is a block diagram of selected components of a microprocessor.

Turning now to FIG. 2, a simplified block diagram of a processor 101 according to one embodiment of the present invention is illustrated. Processor 101 as depicted in FIG. 2 includes an instruction fetch unit 202 suitable for generating an address of the next instruction to be fetched. The instruction address generated by fetch unit 202 provided to an instruction cache 210. Fetch unit 202 may include branch prediction logic that, as its name suggests, is adapted to make an informed prediction of the outcome of a decision that effects the program execution flow. The ability to correctly predict branch decisions is a significant factor in the overall ability of processor 101 to achieve improved performance by executing instructions speculatively and out-of-order. The instruction address generated by fetch unit 202 is provided to an instruction cache 210, which contains a subset of the contents of system memory in a high speed storage facility. The instructions stored in instruction cache 210 are preferably formatted according to a first ISA, which is typically a legacy ISA such as, for example, the PowerPC or an x86 compatible instruction set. Detailed information regarding the PowerPC® instruction set is available in the *PowerPC 620 RISC Microprocessor User's Manual* available from Motorola, Inc. (Order No. MPC620UM/AD), which is incorporated by reference herein. If the address instruction generated by fetch unit 202 corresponds to a system memory location that is currently replicated in instruction cache 210, instruction cache 210 forwards the corresponding instruction to cracking unit 212. If the instruction corresponding to the instruction address generated by fetch unit 202 does not currently reside in instruction cache 210 (i.e., the instruction address provided by fetch unit 202 misses in instruction cache 210), the instructions must be fetched from an L2 cache (not shown) or system memory before the instruction can be forwarded to cracking unit 212.

Cracking unit 212 is adapted to modify an incoming instruction stream to produce a set of instructions optimized for executing in an underlying execution pipeline at high operating frequencies (i.e., operating frequencies exceeding 1 GHz). In one embodiment, for example, cracking unit 212 receives instructions in a 32-bit wide ISA such as the instruction set supported by the PowerPC® microprocessor and converts the instructions to a second, preferably wider, ISA that facilitates execution in a high speed execution unit operating in the gigahertz frequency range and beyond. The wider format of the instructions generated by cracking unit 212 may include, as an example, explicit fields that contain information (such as operand values) that is merely implied or referenced in the instructions received by cracking unit 212, which are formatted according to a first format. In one embodiment, for example, the ISA of instructions generated by cracking unit 212 is 64 or more bits wide.

In one embodiment, cracking unit 212 as contemplated herein, in addition to converting instructions from a first format to a second, and preferably wider, format, is designed to organize a set of fetched instructions into instruction "groups" 302, examples of which are depicted in FIG. 3. Each instruction group 302 includes a set of instruction slots 304a, 304b, etc. (collectively or generically referred to as instruction slots 304). The organization of a set of instructions into instruction groups facilitates high speed execution by, among other things, simplifying the logic needed to maintain rename register mapping and completion tables for a large number of in-flight instructions. In FIG. 3, three examples of instruction grouping that may be performed by cracking unit 212 are depicted.

In Example 1, a set of instructions indicated by reference numeral 301 is transformed into a single instruction group 302 by cracking unit 212. In the depicted embodiment of the invention, each instruction group 302 includes five slots indicated by reference numerals 304a, 304b, 304c, 304d, and 304e. Each slot 304 may contain a single instruction. In this embodiment, each instruction group may include a maximum of five instructions. In one embodiment, the instructions in the set of instructions 301 received by cracking unit 212 are formatted according to a first ISA, as discussed previously, and the instructions stored in the groups 302 are formatted according to a second wider format. The use of instruction groups simplifies renaming recovery and completion table logic by reducing the number of instructions that must be individually tagged and tracked. The use of instruction groups thus contemplates sacrificing some information about each instruction in an effort to simplify the process of tracking pending instructions in an out-of-order processor.

Example 2 of FIG. 3 illustrates a second example of the instruction grouping performed by cracking unit 212 according to one embodiment of the invention. This example demonstrates the capability of cracking unit 212 to break down complex instructions into a group of simple instructions for higher speed execution. In the depicted example, a sequence of two load-with-update (LDU) instructions are broken down into an instruction group including a pair of load instructions in slots 304a and 304c respectively and a pair of ADD instructions in slots 304b and 304d respectively. In this example, because group 302 does not contain a branch instruction, the last slot 304e of instruction group 302 contains no instruction. The PowerPC® load-with-update instruction, like analogous instructions in other instruction sets, is a complex instruction in that the instruction affects the contents of multiple general purpose registers (GPRs). Specifically, the load-with-update instruction can be broken down into a load instruction that affects the contents of a first GPR and an ADD instruction that affects the contents of a second GPR. Thus, in instruction group 302 of Example 2 in FIG. 3, instructions in two or more instruction slots 304 correspond to a single instruction received by cracking unit 212.

In Example 3, a single instruction entering cracking unit 212 is broken down into a set of instructions occupying multiple groups 302. More specifically, Example 3 illustrates a load multiple (LM) instruction. The load multiple instruction (according to the PowerPC® instruction set) loads the contents of consecutive locations in memory into consecutively numbered GPRs. In the depicted example, a load multiple of six consecutive memory locations breaks down into six load instructions. Because each group 302 according to the depicted embodiment of processor 101 includes, at most, five instructions, and because the fifth slot 304e is reserved for branch instructions, a load multiple of six registers breaks down into two groups 302a and 302b respectively. Four of the load instructions are stored in the first group 302a while the remaining two load instructions are stored in the second group 302b. Thus, in Example 3, a single instruction is broken down into a set of instructions that span multiple instruction groups 302.

Figure 5:
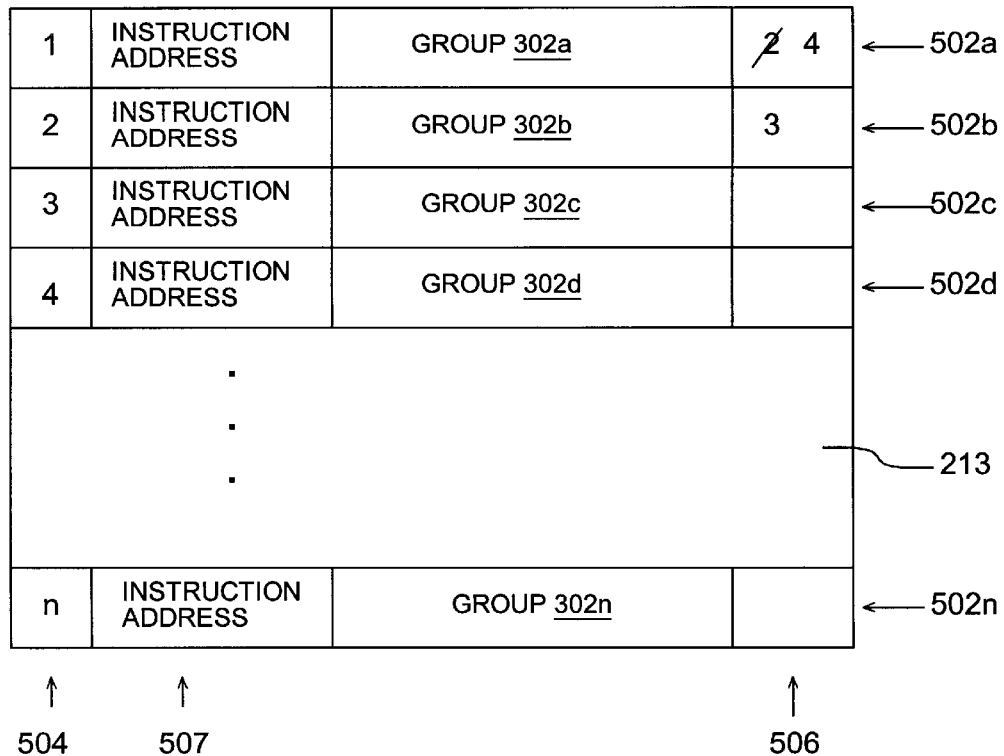
FIG. 5 is block diagram of a basic cache block of the microprocessor of FIG. 2.
Figure 6:
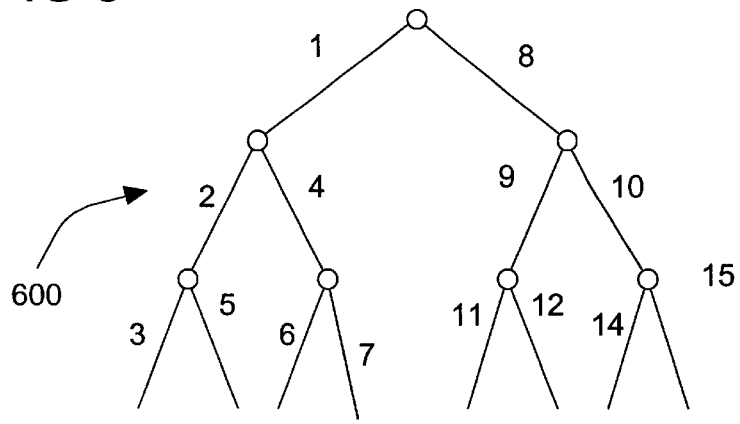
FIG. 6 is an illustration of various branching scenarios that the processor of FIG. 2 may encounter.

Returning now to FIG. 2, the instruction groups 302 generated by the preferred embodiment of cracking unit 212 are forwarded to a basic block cache 213 where they are stored pending execution. Referring to FIG. 5, an embodiment of basic block cache 213 is depicted. In the depicted embodiment, basic block cache 213 includes a set of entries 502a through 502n (generically or collectively referred to as basic block cache entries 502). In one embodiment, each entry 502 in basic block cache 213 contains a single instruction group 302. In addition, each entry 502 may include an entry identifier 504, a pointer 506, and an instruction address (IA) field 507. The instruction address field 507 for each entry 502 is analogous to the IA field 704 of completion table 218. In one embodiment, each entry 502 in basic block cache 504 corresponds to an entry in completion table 218 and the instruction address field 507 indicates the instruction address of the first instruction in the corresponding instruction group 302. In one embodiment, the pointer 506 indicates the entry identifier of the next instruction group 302 to be executed based upon a branch prediction algorithm, branch history table, or other suitable branch prediction mechanism. As indicated previously, the preferred implementation of forming instruction groups 302 with cracking unit 212 allocates branch instructions to the last slot 304e in each group 302. In addition, the preferred embodiment of cracking unit 212 produces instruction groups 302 in which the number of branch instructions in a group 302 is one (or less). In this arrangement, each instruction group 302 can be thought of as representing a "leg" of a branch tree 600 as indicated in FIG. 6, in which instruction groups 302 are represented by their corresponding instruction group entry 504 values. First instruction group 302a, for example, is indicated by its entry number (1), and so forth. Suppose, as an example, that the branch prediction mechanism of processor 101 predicts that leg 2 (corresponding to second group 302b) will be executed following leg 1 and that leg 3 will be executed following leg 2. The basic block cache 213, according to one embodiment of the invention, reflects these branch predictions by setting the pointer 506 to indicate the next group 302 to be executed. The pointer 506 of each entry 502 in basic block cache 213 may be utilized to determine the next instruction group 302 to be dispatched.

Basic block cache 213 works in conjunction with a block fetch unit 215 analogous to the manner in which fetch unit 202 works with instruction cache 210. More specifically, block fetch unit 215 is responsible for generating an instruction address that is provided to basic block cache 213. The instruction address provided by block fetch unit 215 is compared against addresses in the instruction address fields 507 in basic block cache 213. If the instruction address provided by block fetch unit 215 hits in basic block cache 213, the appropriate instruction group is forwarded to issue queues 220. If the address provided by block fetch unit 215 misses in basic block cache 213, the instruction address is fed back to fetch unit 202 to retrieve the appropriate instructions from instruction cache 210. In one embodiment suitable for its conservation of area (die size), basic block cache 213 enables the elimination of instruction cache 210. In this embodiment, instructions are retrieved from a suitable storage facility such as an L2 cache or system memory and provided directly to cracking unit 212. If an instruction address generated by block fetch unit 213 misses in basic block cache 213, the appropriate instructions are retrieved from an L2 cache or system memory rather than from instruction cache 210.

The depicted embodiment of processor 101 further indicates a dispatch unit 214. Dispatch unit 214 is responsible for ensuring that all necessary resources are available prior to forwarding the instructions in each instruction group to their appropriate issue queues 220. In addition, dispatch unit 214 communicates with dispatch and completion control logic 216 to keep track of the order in which instructions were issued and the completion status of these instructions to facilitate out-of-order execution. In the embodiment of processor 101 in which cracking unit 212 organizes incoming instructions into instruction groups as discussed above, each instruction group 302 is assigned a group tag (GTAG) by completion and control logic 216 that conveys the ordering of the issued instruction groups. As an example, dispatch unit 214 may assign monotonically increasing values to consecutive instruction groups. With this arrangement, instruction groups with lower GTAG values are known to have issued prior to (i.e., are older than) instruction groups with larger GTAG values. Although the depicted embodiment of processor 101 indicates dispatch unit 214 as a distinct functional block, the group instruction organization of basic block cache 213 lends itself to incorporating the functionality of dispatch unit 214. Thus, in one embodiment, dispatch unit 214 is incorporated within basic block cache 213, which is connected directly to issue queues 220.

Figure 7:
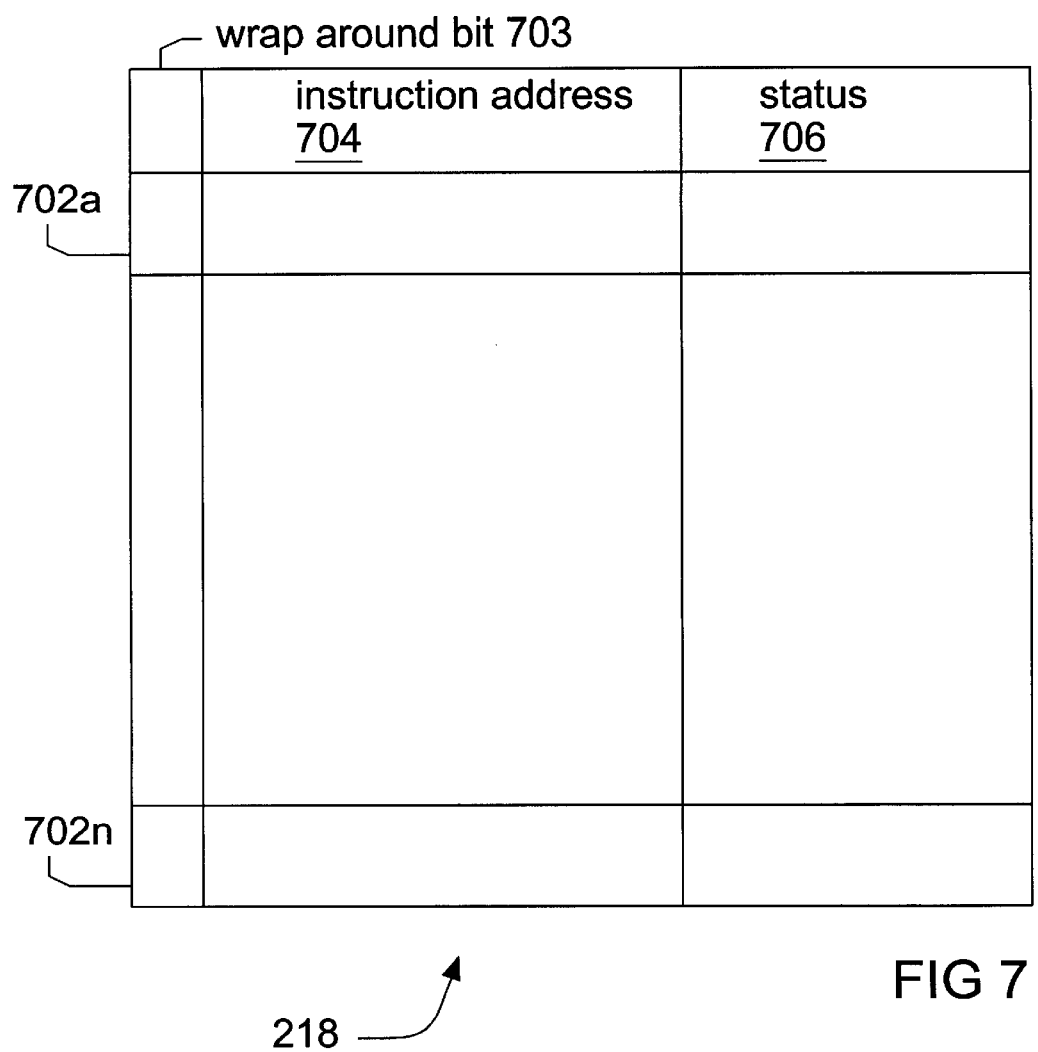
FIG. 7 is a block diagram of a completion table suitable for use with the present invention.

In association with dispatch and completion control logic 216, a completion table 218 is utilized in one embodiment of the present invention to track the status of issued instruction groups. Turning to FIG. 7, a block diagram of one embodiment of completion table 218 is presented. In the depicted embodiment, completion table 218 includes a set of entries 702a through 702n (collectively or generically referred to herein as completion table entries 702). In this embodiment, each entry 702 in completion table 218 includes an instruction address (IA) field 704 and a status bit field 706. In this embodiment, the GTAG value of each instruction group 302 identifies the entry 702 in completion table 218 in which completion information corresponding to the instruction group 302 is stored. Thus, the instruction group 302 stored in entry 1 of completion table 218 will have a GTAG value of 1, and so forth. In this embodiment, completion table 218 may further include a "wrap around" bit to indicate that an instruction group with a lower GTAG value is actually younger than an instruction group with a higher GTAG value. In one embodiment, the instruction address field 704 includes the address of the instruction in first slot 304a of the corresponding instruction group 302. Status field 706 may contain one or more status bits indicative of whether, for example, the corresponding entry 702 in completion table 218 is available or if the entry has been allocated to a pending instruction group.

In the embodiment of processor 101 depicted in FIG. 2, instructions are issued from dispatch unit 214 to issue queues 220 where they await execution in corresponding execution pipes 222. Processor 101 may include a variety of types of executions pipes, each designed to execute a subset of the processor's instruction set. In one embodiment, execution pipes 222 may include a branch unit pipeline 224, a load store pipeline 226, a fixed point arithmetic unit 228, and a floating point unit 230. Each execution pipe 222 may comprise two or more pipeline stages. Instructions stored in issue queues 220 may be issued to execution pipes 222 using any of a variety of issue priority algorithms. In one embodiment, for example, the oldest pending instruction in an issue queue 220 is the next instruction issued to execution pipes 222. In this embodiment, the GTAG values assigned by dispatch unit 214 are utilized to determine the relative age of instructions pending in the issue queues 220. Prior to issue, the destination register operand of the instruction is assigned to an available rename GPR. When an instruction is ultimately forwarded from issue queues 220 to the appropriate execution pipe, the execution pipe performs the appropriate operation as indicated by the instruction's opcode and writes the instruction's result to the instruction's rename GPR by the time the instruction reaches a finish stage (indicated by reference numeral 232) of the pipeline. A mapping is maintained between the rename GPRs and their corresponding architected registers. When all instructions in an instruction group (and all instructions in younger instruction groups) finish without generating an exception, a completion pointer in the completion table 218 is incremented to the next instruction group. When the completion pointer is incremented to a new instruction group, the rename registers associated with the instructions in the old instruction group are released thereby committing the results of the instructions in the old instruction group. If one or more instructions older than a finished (but not yet committed) instruction generates an exception, the instruction generating the exception and all younger instructions are flushed and a rename recovery routine is invoked to return the GPR mapping to the last known valid state.

If a predicted branch is not taken (branch misprediction), the instructions pending in executions pipes 222 and issue queues 220 are flushed. In addition, the pointer 506 of the basic block cache entry 502 associated with the mispredicted branch is updated to reflect the most recent branch taken. An example of this updating process is illustrated in FIG. 5 for the case in which program execution results in a branch from leg 1 (instruction group 302a) to leg 4 (instruction group 302d). Because the pointer 506 of entry 502a had previously predicted a branch to the instruction group residing in the number 2 entry of basic block cache 213 (i.e., group 302b), the actual branch from instruction group 302a to group 302d was mispredicted. The mispredicted branch is detected and fed back to block fetch unit 215, the instructions pending between basic block cache 213 and the finish stage 232 of each of the pipelines 222 are flushed, and execution is re-started with instruction group 302d in entry 4 of basic block cache 213. In addition, the pointer 506 of basic block cache entry 502a is altered from its previous value of 2 to its new value of 4 reflecting the most recent branch information. By incorporating basic block cache 213 and block fetch unit 215 in close proximity to the execution pipelines 222, the present invention contemplates a reduced performance penalty for a mispredicted branch. More specifically, by implementing basic block cache 213 on the "downstream" side of instruction cracking unit 212, the present invention eliminates instructions that are pending in cracking unit 212 from the branch misprediction flush path thereby reducing the number of pipeline stages that must be purged following a branch mispredict and an reducing the performance penalty. In addition, the basic block cache 213 contemplates a caching mechanism with a structure that matches the organization of dispatch and completion control unit 216 and completion table 218 thereby simplifying the organization of the intervening logic and facilitating the implementation of useful extensions to the basic block cache 213 as described below.

Figure 8:
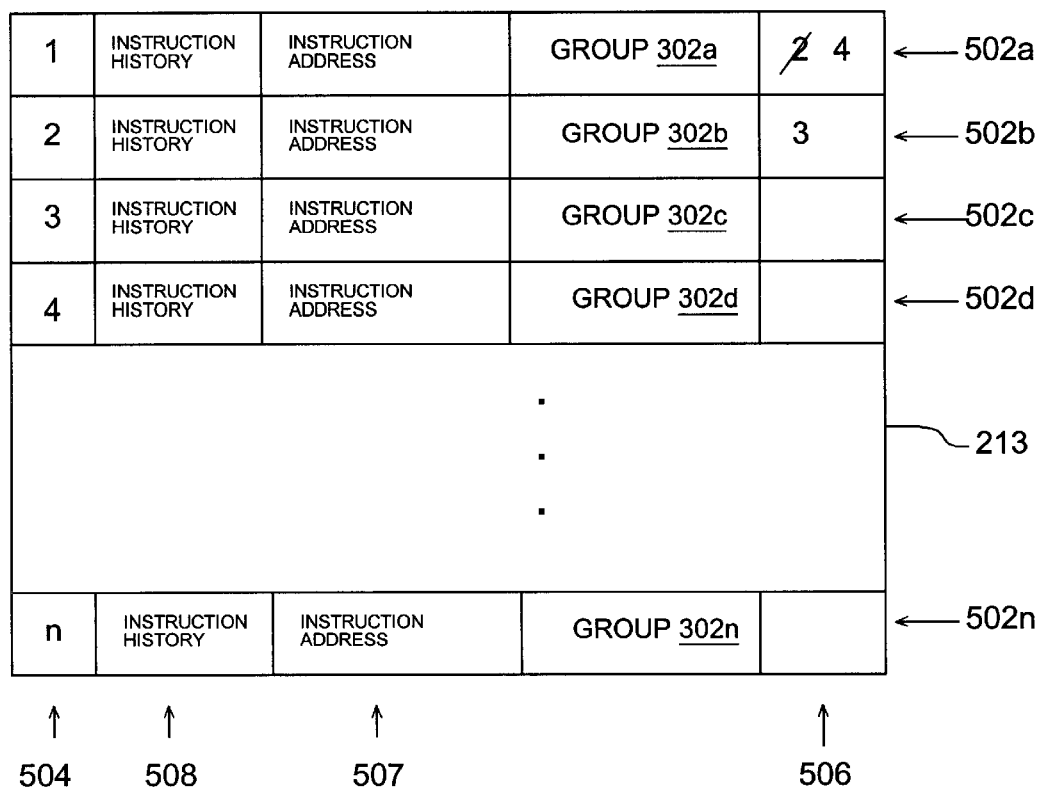
FIG. 8 is a block diagram of a basic block cache that includes instruction history information.

In one embodiment, basic block cache 213 further includes instruction history information that beneficially enables improved processor performance by recording information that might be used during subsequent execution of the same instruction group to avoid scenarios that are likely to result in exceptions, flushes, interrupts, or other performance limiting events (collectively referred herein as exception events). In the embodiment of basic block cache 213 depicted in FIG. 8, the instruction history information is stored in an instruction history field 508 of each entry 502. As an example of the type of information that might be stored in instruction history field 508, consider an instruction group that contains a particular load instruction that resulted in a store forwarding exception the last time the load instruction was executed. A store forward exception, as that term is used herein, occurs when a load instruction that follows (in program order) a store instruction sharing a common memory reference executes before the store instruction in an out-of-order machine. Because the load instruction retrieves an invalid value from the register if it executes prior to the store instruction, an exception is generated that results in an instruction flush. The parallelism between the structure of basic block cache 213 and the completion and control logic 216 greatly facilitates the task of forwarding information learned by dispatch and completion control logic 216 about the manner in which instructions executed and completed to a corresponding entry in basic block cache 213. In the absence of this parallelism, the completion information from dispatch and completion control logic 216 would typically be required to pass through some manner of intervening hashing table or other suitable mechanism to correlate group instruction information to its component instructions. In the store forwarding example, upon detecting a store forwarding exception, dispatch and completion control unit 216 would write one or more bits in instruction history field 508 of the appropriate entry in basic block cache 213 that would signify the store forwarding exception. If the instruction group was subsequently executed, the instruction history information indicating the previous occurrence of a store forwarding exception could be used, for example, to place processor 101 into an in-order mode in which loads are prevented from executing prior to stores are completed. Thus, this embodiment of the invention contemplates recording instruction history information that is indicative of an exception event associated with an instruction group and thereafter modifying the execution of the instruction group to prevent the exception event from occurring during a subsequent execution of the instruction group. Although illustrated with the store forwarding example, the instruction history information field 508 as contemplated herein is suitable for recording information relevant to a variety of instruction history events that might enable the processor to avoid a recurring exception condition such as information relevant to the accuracy of any prediction mechanisms, operand value prediction, cache miss/hit information, and so forth.

Figure 9:
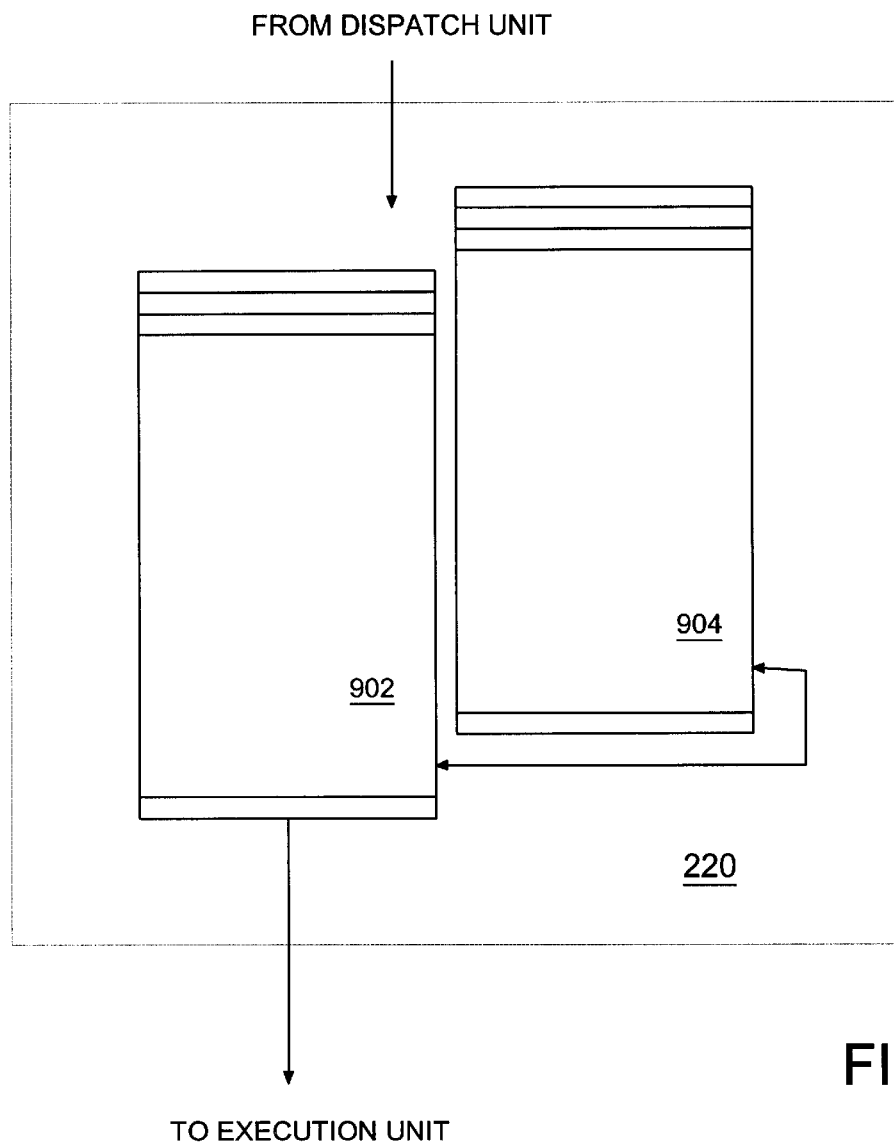
FIG. 9 is a block diagram of an issue queue including a primary and secondary issue queue according to one embodiment of the invention.

One example of information that might be recorded in execution history field 508 of basic block cache 213 is emphasized by the embodiment depicted in FIG. 9 in which one or more of the issue queues 220 is sub-divided into a primary issue queue 902 and second issue queue 904. The optimum size or depth of the issue queues 220 represents a balance between competing considerations. On the one hand, it is desirable to implement very large and deep issue queues to take maximum advantage of the ability of processor 101 to execute instructions out-of-order. The ability to issue instructions out-of-order is limited by the number of instructions that are pending in issue queues 220. A larger number of issue queues corresponds to a larger number of instructions eligible for out-of-order processing. On the other hand, as the depth of issue queue 220 grows, the ability of the processor to determine the next instruction to be issued within the cycle time constraints of the processor decreases. In other words, the greater the number of instructions pending in issue queue 220, the longer the time required to determine the next instruction to issue. For this reason, issue queues such as issue queue 220 are frequently limited to a depth of approximately 20 or less. One embodiment of the invention contemplates achieving the benefits of deep issue queues without requiring a significant increase in the logic required to search the issue queues for the next eligible instruction to issue. The invention takes advantage of the fact that frequently, an instruction pending in issue queue 220 is not eligible for immediate issue either because it has already been issued and is pending in the execution pipelines 222 of processor 101 or it is awaiting the completion of another instruction on which it depends for an operand value.

Referring to FIG. 9, an issue queue 220 according to one embodiment of the present invention comprises a primary issue queue 902 and a secondary issue queue 904. Primary issue queue 902 contains instructions that are eligible for immediate issue. In one embodiment, instructions dispatched from dispatch unit 214 are initially stored in an available entry of primary issue queue 902. If it is subsequently determined that an instruction has a dependency on another instruction, the dependent instruction is moved to secondary issue queue 904 until the instruction on which the dependent instruction depends has retrieved the necessary information. If, for example, an add instruction following a load instruction requires the result of the load instruction, both of the instructions may be initially dispatched to primary issue queue 902. Upon subsequently determining that the add instruction has a dependency on the load instruction however, the add instruction is transferred from primary issue 902 to secondary issue queue 904. In an embodiment utilizing the instruction history field 508 as discussed previously with respect to FIG. 8, the add instruction's dependency may be recorded such that, during a subsequent execution of the instructions, the add instruction may be stored directly into secondary issue queue 220. The secondary issue queue 904 may also be used to store instructions that have been recently issued and are still pending in the execution pipelines of the processor. In this embodiment, an instruction is issued from the primary issue queue 902 and then transferred to the secondary issue queue 904. In one embodiment, the instruction may reside in the secondary issue queue 904 until it is determined that the instruction will not be rejected. One method of determining that an instruction has not been rejected is to implement a timer/counter (not shown) associated with each entry in secondary issue queue 904. When an instruction is initially transferred from primary issue queue 902 to secondary issue 904, the counter/timer is initiated. In one embodiment, the counter/timer counts the number of clock cycles that have expired since the counter/timer was initiated. If the counter/timer continues to count for a predetermined number of cycles, without detecting that the instruction has been rejected, instruction is presumed to have completed successfully and the entry in secondary issue queue 904 is de-allocated. By utilizing an issue queue comprising a primary issue queue that is dedicated for instructions that are currently eligible to be issued for execution in conjunction with a secondary issue queue in which instructions that have been dispatched, but are not currently eligible for execution, either because of an instruction dependency or because the instruction was recently issued from the primary issue queue, the effective size or depth of the issue queue is increased without significantly increasing the time (i.e., number of logic levels) required to determine a next instruction to issue.

It will be apparent to those skilled in the art having the benefit of this disclosure that the present invention contemplates a various embodiment of a microprocessor including a cache facility suitable for storing grouped instructions (i.e., instructions that have been converted from a first format to a second format) to reduce the latency associated with a mispredicted branch. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of executing microprocessor instructions comprising:
   organizing a set of received instructions into an instruction group, wherein the instruction group includes at most one branch instruction and wherein the branch instruction comprises the last instruction in the group, and storing the instructions in the instruction group in an entry of a basic block cache;
   dispatching the instruction group for execution and allocating an entry in a completion table corresponding to the dispatched instruction group, wherein each entry in the completion table corresponds to an entry in the basic block cache;
   upon executing the instruction group, recording instruction history information indicative of whether execution of the instruction group resulted in a store forwarding exception in which a load instruction that follows, in program order, a store instruction sharing a common memory reference executes before the store instruction; and
   modifying the execution of the instruction group responsive to the instruction history information by entering an in-order execution mode prior to a subsequent execution of the instruction group.

2. The method of claim 1, further comprising, issuing instruction groups from the basic block cache for execution.

3. The method of claim 1, further comprising, prior to organizing the received instructions into the instruction group, converting each of the received instructions from a first instruction format to a second instruction format, wherein the second instruction format includes more bits per instruction than the first instruction format.

4. A microprocessor comprising:
   a storage facility;
   cracking unit configured to receive a set of instructions from the storage facility and adapted to organize the set of instructions into an instruction group, wherein the instruction group includes at most one branch instruction and wherein the branch instruction if comprises the last instruction in the group; and
   a basic block cache suitable for storing the instruction group, wherein the basic block cache includes an instruction history field corresponding to a basic block cache entry, wherein the instruction history information is indicative of whether a prior execution of the instruction group resulted in a store forwarding exception;
   wherein the microprocessor is configured to modify the execution of the instruction group during a subsequent execution in response to the instruction history information by entering an in-order execution mode prior to the subsequent execution of the instruction group wherein a load instruction that follows, in program order, a store instruction sharing a common memory reference executes before the store instruction.

5. The processor of claim 4, further comprising a completion table for tracking progress of instructions during wherein the completion table is organized as a set of instruction group entries wherein each in entry in the completion corresponds to an instruction in the basic block cache.

6. The processor of claim 5, further comprising completion table control logic configured to store information in the instruction history field when the instruction group completes.

7. The processor of claim 4 wherein the cracking unit modifies the format of the set of instructions from a first instruction format to a second instruction format, wherein the second instruction format uses more bits per instruction than the first instruction format.

8. A data processing system including at least one processor, memory, input means, and display means, wherein the processor comprises:

a storage facility;

cracking unit configured to receive a set of instructions from the storage facility and adapted to organize the set of instructions into an instruction group, wherein the instruction group includes at most one branch instruction and wherein the branch instruction if comprises the last instruction in the group; and a basic block cache suitable for storing the instruction group as a single entry within the basic block cache, wherein the basic block cache includes an instruction history field corresponding to each basic block cache entry, wherein the instruction history information is indicative of whether a prior execution of the instruction group resulted in a store forwarding exception;

wherein the microprocessor is configured to modify the execution of the instruction group during a subsequent execution in response to the instruction history information by entering an in-order execution mode prior to the subsequent execution of the instruction group wherein a load instruction that follows, in program order, a store instruction sharing a common memory reference executes before the store instruction.

9. The system of claim 8, wherein each of the received instruction is formatted according to a first instruction format wherein the cracking unit converts each of the received instructions from the first instruction format to a second instruction formation wherein each instruction within the instruction group is formatted according to the second format and further wherein the second instruction format has more bits per instruction than the first instruction format.

10. The system of claim 8, further comprising completion table control logic configured to store information in the instruction history field when the instruction group completes.

11. The system of claim 8, wherein the cracking unit modifies the format of the set of instructions from a first instruction format to a second instruction format, wherein the second instruction format uses more bits per instruction than the first instruction format.

12. The method of claim 3, wherein the second instruction format includes explicit references to operands that are implied in the first instruction format.

* * * * *

UNITED STATES PATENT AND TRADEMARK OFFICE
CERTIFICATE OF CORRECTION

PATENT NO.    : 6,697,939 B1
DATED         : February 24, 2004
INVENTOR(S)   : James Allan Kahle It is certified that error appears in the above-identified patent and that said Letters Patent is hereby corrected as shown below:

Column 14,
Lines 13-21, Claim 9, should read as follows:
9. The system of claim 8, wherein each of the received instruction is formatted according to a first instruction format and wherein the cracking unit converts each of the received instructions from the first instruction format to a second instruction formation wherein each instruction within the instruction group is formatted according to the second format and further wherein the second instruction format has more bits per instruction than the first instruction format.

Signed and Sealed this

Twenty-sixth Day of October, 2004

JON W. DUDAS
*Director of the United States Patent and Trademark Office*